US008291091B2

(12) United States Patent
Naniyat

(10) Patent No.: US 8,291,091 B2
(45) Date of Patent: Oct. 16, 2012

(54) METHOD AND APPARATUS FOR SHARING DATA IN NEAR FIELD COMMUNICATION NETWORK

(75) Inventor: Arun Naniyat, Bangalore (IN)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 186 days.

(21) Appl. No.: 12/325,367

(22) Filed: Dec. 1, 2008

(65) Prior Publication Data

US 2009/0144435 A1 Jun. 4, 2009

(30) Foreign Application Priority Data

Nov. 30, 2007 (IN) .......................... 2842/CHE/2007

(51) Int. Cl.
*G06F 15/16* (2006.01)
(52) U.S. Cl. ......... 709/228; 709/227; 709/223; 709/248
(58) Field of Classification Search .......... 709/220–223, 709/227–228, 248
See application file for complete search history.

(56) References Cited

U.S. PATENT DOCUMENTS

| | | | | |
|---|---|---|---|---|
| 5,600,776 | A * | 2/1997 | Johnson et al. | 715/733 |
| 7,584,412 | B1 * | 9/2009 | Raff | 715/203 |
| 7,657,255 | B2 * | 2/2010 | Abel et al. | 455/414.1 |
| 7,680,067 | B2 * | 3/2010 | Prasad et al. | 370/254 |
| 7,797,386 | B2 * | 9/2010 | Burns | 709/206 |
| 2005/0135628 | A1 * | 6/2005 | Dacosta | 380/283 |
| 2007/0043594 | A1 * | 2/2007 | Lavergne | 705/2 |
| 2007/0055633 | A1 | 3/2007 | Cheon et al. | |
| 2007/0132768 | A1 * | 6/2007 | Podnar et al. | 345/520 |
| 2007/0190939 | A1 | 8/2007 | Abel | |
| 2008/0115073 | A1 * | 5/2008 | Erickson et al. | 715/766 |
| 2008/0132167 | A1 * | 6/2008 | Bent et al. | 455/41.2 |
| 2008/0288404 | A1 * | 11/2008 | Pirzadeh et al. | 705/44 |
| 2008/0288958 | A1 * | 11/2008 | Ryoo et al. | 719/313 |
| 2009/0006972 | A1 * | 1/2009 | Karlson et al. | 715/737 |
| 2009/0070472 | A1 * | 3/2009 | Baldus et al. | 709/227 |
| 2009/0081943 | A1 * | 3/2009 | Dobyns et al. | 455/1 |
| 2009/0086657 | A1 * | 4/2009 | Alpert et al. | 370/310 |
| 2009/0111378 | A1 * | 4/2009 | Sheynman et al. | 455/41.1 |

FOREIGN PATENT DOCUMENTS

| | | |
|---|---|---|
| JP | 2002-099493 A | 4/2002 |
| JP | 2002-101457 A | 4/2002 |
| JP | 2006-157725 A | 6/2006 |
| WO | 2006-082861 A1 | 8/2006 |

(Continued)

OTHER PUBLICATIONS

Csapodi, Marton, et al.; "New Applications for NFC Devices;" Mobile and Wireless Communications Summit; 16th IST; Jul. 1-5, 2007.

(Continued)

*Primary Examiner* — Abdullahi Salad
(74) *Attorney, Agent, or Firm* — Cha & Reiter, LLC

(57) ABSTRACT

A method for managing data between a plurality of electronic devices in a Near Field Communication (NFC) network in which a first electronic device initially establishes a communication link with at least one of the plurality of electronic devices. The desktop configuration information is then exchanged with at least another electronic device. Thereafter, desktop data of the first electronic device can be shared with the at least one of the plurality of electronic devices.

17 Claims, 5 Drawing Sheets

FOREIGN PATENT DOCUMENTS

WO    2007-129139 A1    11/2007

OTHER PUBLICATIONS

Podnar, Paul J., et al.; Patent Application Publication No: US 2007/0132768 A1; Publication Date: Jun. 14, 2007; "Accessible Display System;" . . . .

Abel, Miller T.; Patent Application Publication No: US 2007/0190939 A1; Publication Date: Aug. 16, 2007; "Means for Provisioning and Managing Mobile Device Configuration Over . . . ,". . . . .

Cheon, Sung-Rock, et al.; Patent Application Publication No: US 2007/0055633 A1; Publication Date: Mar. 8, 2007; "Secure NFC Apparatus and Method Supporting Various Security . . . ,". . . .

\* cited by examiner

(12) United States Patent
US 8,291,091 B2

METHOD AND APPARATUS FOR SHARING DATA IN NEAR FIELD COMMUNICATION NETWORK

CLAIM OF PRIORITY

This application claims priority from an application entitled "Method and apparatus for Sharing Data in Near Field Communication Network" filed in the Indian Patent Office on Nov. 30, 2007 and assigned Serial No. 2842/CHE/2007, the contents of which are hereby incorporated by reference in its entirety.

BACKGROUND OF THE INVENTION

1. Field of Invention

The present invention, in general, relates to a field of managing data in short range wireless communication network. More particularly, the present invention relates to a method and apparatus for sharing data between electronic devices in Near Field Communication (NFC) network.

2. Description of Related Art

Portable electronic devices, including but in no way being limited to mobile phones, personal digital assistances (PDAs), set-top boxes, etc. are frequently used for communication. For example, such electronic devices are used for direct communication and communication over a network, such as a telecommunication network. However, the use of portable electronic devices is not limited strictly to communication, as such devices can also be used for sharing data, listening music, watching stored videos, watching active contents/live contents and the like. For example, a user of a mobile phone can watch videos on the mobile phone, listen to songs, and can send short/multimedia messages.

Furthermore, the user can also share and/or send stored data (e.g. video files) to other electronic devices having a bigger display screen, if size of a display screen of the mobile phone is not appropriate for viewing the video. The data can be shared between two electronic devices through a telecommunication network, a short range wireless communication network and the like. For example, a mobile phone can share data file with another electronic device through short range wireless communication, for example, short range radio (Bluetooth®), infrared light (IR) and Near Field Communication (NFC).

For sharing data using Bluetooth® or infrared light (IR), a user has to perform several activities, such as selecting data to be sent, activating a communication technique (for example, activating Bluetooth, or IR), searching for an electronic device in the vicinity of the mobile phone, selecting an electronic device to which the data is to be sent, and then sending the data to the selected electronic device.

However, in Near Field Communication, which is a short-range wireless communication technology, a communication channel is established automatically as soon as two electronic devices are placed close to each other. NFC enables exchange of data between devices within ~10 centimeter distance. Thus in NFC, manual intervention for sharing data is very minimal. Hence, it is more convenient for users to share data using NFC than Bluetooth or IR.

In light of the above, there is a long-felt need in the art for a method and apparatus for managing and sharing data between electronic devices through NFC.

SUMMARY OF THE INVENTION

The invention provides a method for managing data between a plurality of electronic devices in a Near Field Communication (NFC) network. The method includes, for example, at a first electronic device includes establishing a communication link with at least one of the plurality of electronic devices. The method then exchanges desktop configuration information with at least one of the plurality of electronic devices. Thereafter, desktop data is shared with said at least one of the plurality of electronic devices.

In an exemplary embodiment, a first electronic device is provided. The first electronic device may include a transceiver and a processor. The transceiver establishes communication link with at least one of a plurality of electronic devices. The processor enables exchange of desktop configuration information with at least one of the plurality of electronic devices. The processor also enables the first electronic device to share desktop data with at least one of the plurality of electronic devices.

DETAILED DESCRIPTION

The terms used to describe the various embodiments described herein are exemplary. It should be understood by a person of ordinary skill in the art that these terms are provided to merely aid the understanding of the description, and that their use and definitions in no way limits the scope of the invention. Terms first, second, and the like are used to differentiate between objects having the same terminology and are not intended to represent a chronological order, as and where stated otherwise. A set is defined as a non-empty set including at least one element.

Figure 1:
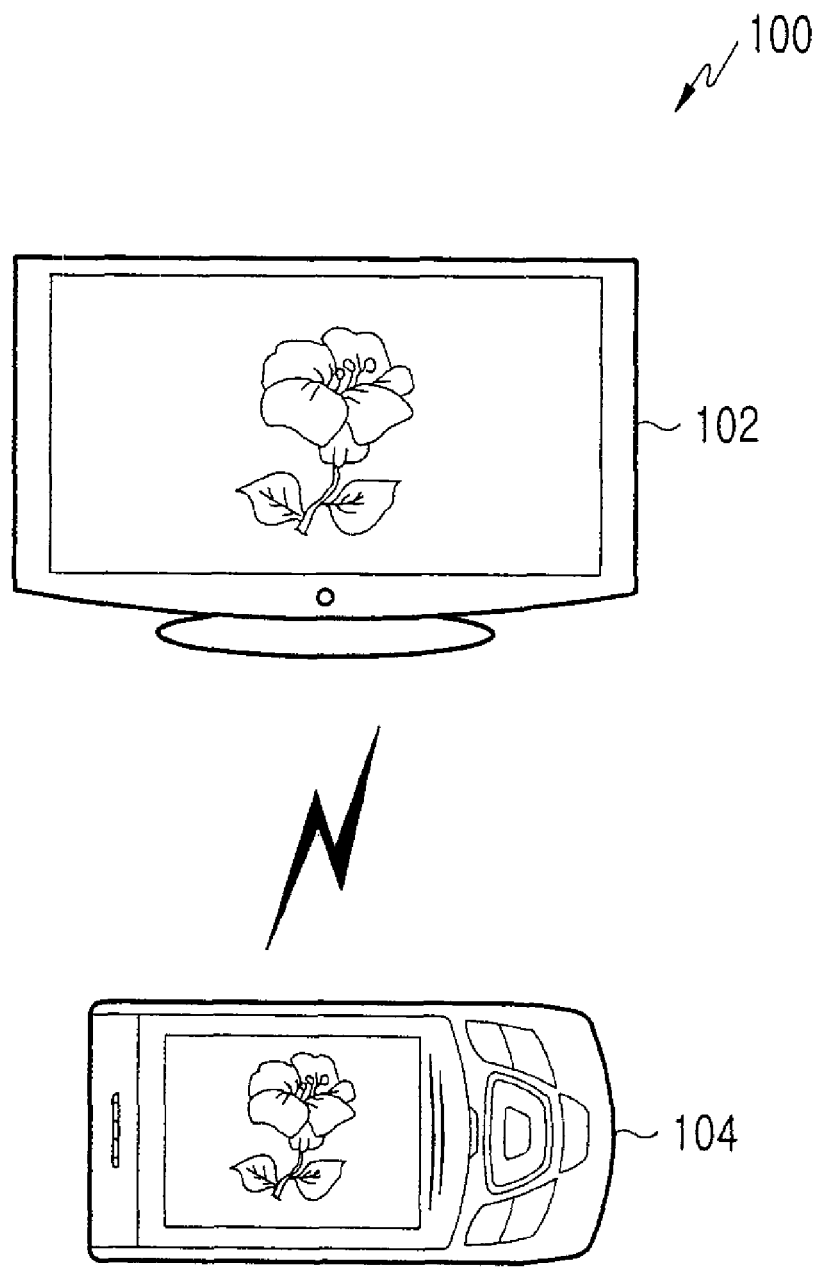
FIG. 1 illustrates an exemplary environment, in accordance with an exemplary embodiment of the present invention.

FIG. 1 illustrates an exemplary environment 100 in accordance with an exemplary embodiment of the present invention.

Referring now to FIG. 1, the environment 100 includes a plurality of electronic devices, for example, an electronic device 102 and an electronic device 104. However, only two electronic devices are shown in the environment 100, it will be apparent to the person ordinary skilled in the art that the environment 100 typically includes a larger quantity of electronic devices.

Examples of the electronic devices 102 and 104 include, but are not limited to, mobile phones, televisions, personal digital assistants (PDA) and computers, just to name a few non-limiting examples. The electronic devices 102 and 104 in this example are capable of communicating with each other using a telecommunication network. In another exemplary embodiment, the electronic devices 102 and 104 are capable of communicating with each other through short range wireless communication technology. Examples of short range wireless communication technology includes but are not limited to, short range radio (Bluetooth®), WLAN (IEEE 802.11), infrared light (IR) and Near Field Communication (NFC).

In the environment 100, the electronic devices 102 and 104 are capable of communicating with each other through Near Field Communication (NFC) technology. In an exemplary embodiment, a user of the electronic device 104 can view data displayed on a display screen of the electronic device 104 on a display screen of the electronic device 102. In this exemplary embodiment, the user has to initially bring the electronic devices 102 and 104 within a predefined distance.

In an exemplary embodiment, the predefined distance is specific to the standards of a communication technology. For example, in NFC the predefined distance is less than 10 centimeters. The reason required to bring them so close together is because NFC enables exchange of data between electronic devices within a 10 centimeter distance of each other. Hence, when the communication link is established between electronic devices 102 and 104, the data can be shared and exchanged through NFC. Therefore active data displayed on the electronic device 104 can be shared with the electronic device 102. For example, data displayed at a display screen of the electronic device 104 can be viewed on the display screen of the electronic device 102.

Figure 2:
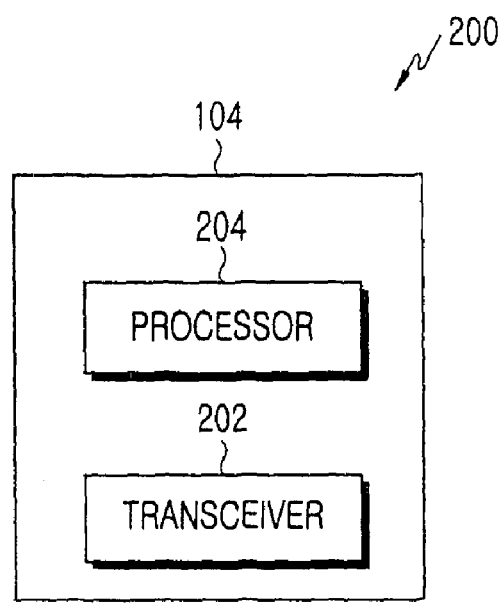
FIG. 2 illustrates a first electronic device, in accordance with an exemplary embodiment of the present invention.

FIG. 2 illustrates the first electronic device 104 in accordance with an exemplary embodiment of the present invention. To explain the first electronic device, reference will be made to FIG. 1. However, it will be apparent to a person ordinarily skilled in the art that the present exemplary embodiment can be explained with the help of any other suitable exemplary description of the present invention.

Referring now to FIG. 2, the first electronic device 104 preferably includes a transceiver 202 and a processor 204. The transceiver 202 establishes a communication link with at least one of a plurality of electronic devices. In an exemplary embodiment, the transceiver 202 is capable of receiving and sending data between electronic devices, for example, between electronic devices 102 and 104. In an exemplary embodiment, the transceiver 202 is a short range transceiver. In the environment 100 (shown in FIG. 1), when the electronic device 102 and the electronic device 104 (capable of communicating through NFC) are within a predefined distance to each other, a communication link is established through the transceiver 202.

Thereafter, the processor 204 enables the electronic device 104 to exchange desktop configuration information with at least one device, typically out of a plurality of electronic devices, for example, a plurality of devices such as the electronic device 102. The processor 204 also enables the electronic device 102 to share desktop data with at least one electronic device. Hence, initially the transceiver 202 establishes a NFC network. Thereafter, processor 204 identifies desktop configuration details in the electronic device 104.

The desktop configuration details are then exchanged with the electronic device 102. The data displayed on a display screen of the electronic device 104 is shared with the electronic device 102. In an exemplary embodiment, data displayed on a display screen of the electronic device 104 is shared based on a desktop configuration response received from at least one of the plurality of electronic devices, for example, the electronic device 102 shown in FIG. 1. In an exemplary embodiment, the desktop configuration response is received through the transceiver 202.

Moreover, the electronic device 102 may send the desktop configuration response as being positive if the electronic device 102 is capable of sharing active data. Similarly the desktop configuration response can be negative in the case where the electronic device 102 is not capable of sharing active data. Thereafter, the desktop configuration response is processed in the electronic device 104. In an exemplary embodiment, the desktop configuration response is processed by the processor 204.

Figure 3:
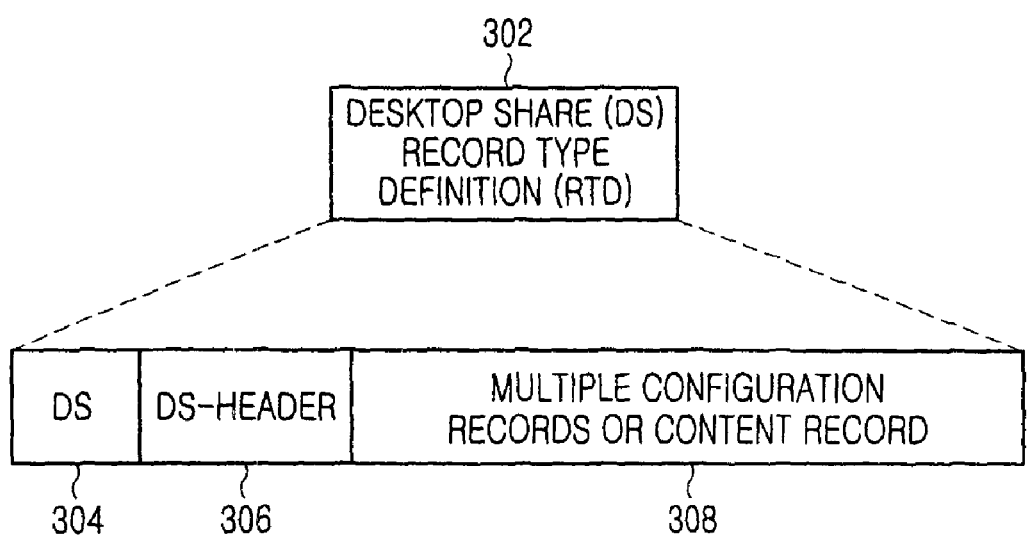
FIG. 3 illustrates a desktop share Record Type Definition (RTD) layout, in accordance with an exemplary embodiment of the present invention.

FIG. 3 illustrates a desktop share Record Type Definition (RTD) layout in accordance with an exemplary embodiment of the present invention.

Referring now to FIG. 3, the desktop share(DS) RTD 302 comprises a NFC record Type definition. A Record Type Definition (RTD) can be defined as a uniform way by which application entities are conveyed in NFC.

The (DS) RTD 302 is used to exchange the active desktop data. The size of the desktop share RTD 302 is one byte (eight bits). The Desktop Share RTD 302 contains information regarding active data that is to be exchanged. In an exemplary embodiment, the DS RTD 302 includes a DS field 304, a DS-header field 306 and a multiple configuration records or content record field 308. The DS field 304 signifies a first bit (Bit 0 also referred as B0). B0 is associated with DS RTD Header type, for example, the value in the B0 of the DS RTD 302 notifies type of communication. The B0 value signifies that whether the DS RTD 302 is used as a Configuration record header or for Content transfer header. Hence, the DS field 304 identifies type of configuration. For example, the communication of the DS field 304 is for configuration or data exchange.

A bit field 306 may store the next three bits (Bit 1, Bit 2 and Bit 3, also referred to as B1, B2 and B3 respectively) of the first bit. B1, B2 and B3 are associated with current active desktop information. The current active desktop information may comprise, for example, an empty desktop (wall paper image, clock parameters etc.), SMS(short message service) content, application initiation, phone book entry (.vcf format), and/or Chat-Session initiation. A bit field 308 may store the remaining bits (Bit 4, Bit 5, Bit 6 and Bit 7, also referred as B4, B5, B6 and B7 respectively). B4, B5, B6 and B7 are used for Multiple Configuration Record or Content Record. In an exemplary embodiment, the desktop share record type definition performs negotiation of different types of configurations in a unified way. In another exemplary embodiment, the desktop share record type definition performs negotiation of the data contents as per the different application types.

Figure 4:
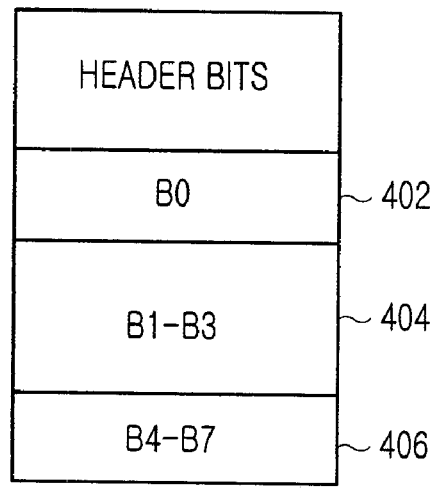
FIG. 4 illustrates an exemplary data format of desktop configuration exchange using desktop share RTD, in accordance with an exemplary embodiment of the present invention.

FIG. 4 illustrates an exemplary data format of desktop configuration exchange using DS RTD, in accordance with an exemplary embodiment of the present invention.

Referring now to FIG. 4, the DS RTD is a one byte (eight bits) field. The DS RTD includes a bit field 402, a bit field 404 and a bit field 406. The bit field 402 is a one bit field that signifies B0. The value in B0 the represents DS RTD header. In an exemplary embodiment, when B0 value is '0' the DS RTD will function for configuration exchange record.

Bit field 404 preferably comprises a three-bit field that signifies the next three bits (Bit 1, Bit 2 and Bit 3) of B0. The value in B1, B2 and B3 represents active desktop information/ data in a communication. In an embodiment, when the all the three bit (B1, B2 and B3) values are '0', for example, then B1B2B3 is '000', and the information related to empty desktop is sent to at least one of a plurality of electronic devices.

When B1 and B2 values are '0' and B3's value is '1', for example, when B1B2B3 is '001', the information related to the Chat Session is shared.

Similarly, when B1 and B3 value is '0' and B2 value is '1', for example B1B2B3 is '010', the information related to the SMS content is shared. When B1 value is '0' and, B2 and B3 value is '1', for example B1B2B3 is '011', the information related to application initiation is shared. When B1 value is '1' and B2 and B3 value is '0', for example B1B2B3 is '100' the information related to the phone book is shared.

The values of bits and the application corresponding to the values described above are solely for the purpose of clarity of explanation, and in no way limits the scope of the invention. Hence, a person skilled in the art can use any value for any applications and data.

A bit field 406 in this example comprises a three-bit wide field, which signifies the next four bits, for example Bit 4, Bit 5, Bit 6 and Bit 7 (also referred as B4, B5, B6 and B7). The values in B4, B5, B6 and B7 represent information about handover or other RTD inclusion. In an exemplary embodiment, DS RTD can embed multiple configuration records, as well as multiple data records, into a single RTD record.

For the sake of clarity, the above information represented in values of bits in the DS RTD is summarized below:
1. B0 when set as '0' signifies the configuration header
2. B1, B2 and B3 when set as:
'000' signifies sharing Active Content of Empty Desktop
'001' signifies sharing Active Content of Chat Session
'010' signifies sharing Active Content of SMS content
'011' signifies sharing Active content—Application initiation
'100' signifies sharing Active Content—Phone Book
3. B4, B5, B6 and B7 represent information about Handover or other RTD inclusion.

In an exemplary embodiment, B4, B5, B6 and B7 can be used to relay information of any other type of RTD which maybe piggy-backed with the DS RTD record.

Figure 5:
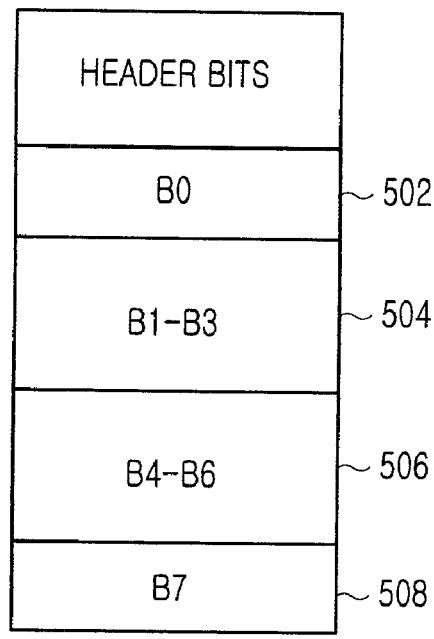
FIG. 5 illustrates an exemplary data format of content exchange using desktop share RTD, in accordance with another exemplary embodiment of the present invention.

FIG. 5 illustrates a header format of content exchange using DS RTD, in accordance with an exemplary embodiment of the present invention.

Referring to the example shown in FIG. 5, the DS RTD preferably includes a B0 field 502, a B1-B3 field 504, a B4-B6 field 506 and a B7 field 508.

The B0 field 502 represents a first bit (B0). B0 represents DS RTD header. In an exemplary embodiment, when B0 is set as 1, the Desktop Sharing RTD will function for a content exchange record.

A B1-B3 field 504 signifies next three bits (B1, B2 and B3) of B0. Value in B1, B2 and B3 represent the current active desktop information. In an embodiment, when the all the three bit (B1, B2 and B3) value is '0', for example B1B2B3 is '000' the information related to empty desktop is sent to at least one of the plurality of electronic devices. Similarly, when B1 and B2 value is '0' and B3 value is '1', for example, B1B2B3 is '001' the information related to chat sessions is shared.

Further, when B1 and B3 value is '0' and B2 value is '1', for example B1B2B3 is '010' the information related to SMS content is shared. When B1 value is '0' and B2 and B3 value is '1', for example B1B3B3 is '011' the information related to application initiation is shared. When B1 value is '1' and B2 and B3 value is '0', for example B1B2B3 is '100' the information related to phone book is shared.

Still referring to FIG. 5, the B-B6 field 506 represents the next three bits (B4, B5, and B6) of the three bits. The value in B4, B5 and B6 represents the type of Handover communication record. In an embodiment, when all the three bit (B4, B5 and B6) is set to '0', for example B4B5B6 is '000', it signifies Bluetooth handover Record Content. When B4 and B5 value is '0' and B6 value is '1', for example B4B5B5 is '001' it relates to Wi-Fi Handover record.

Similarly, when B4 and B6 value is 0 and B5 value is '1', for example B4B5B6 is '010' it represents a WiMedia Handover Record. A bit field 508 represents the Bit 7, also referred as B7. B7 is unused in this example and can be reserved for a future function. The values of the bits and the application corresponding to the values described above are solely for the purpose of clarity and does not limit the scope of the invention. Hence, a person skilled in the art can use any value for any applications and data.

For the sake of clarity the above information represented in values of bits in the DS RTD is summarized below:
1. B0 when set as '1' signifies the Content record header
2. B1, B2 and B3 when set as:
'000' signifies sharing of the Active Content of Empty Desktop
'001' signifies sharing of the Active Content of Chat Session
'010' signifies sharing of the Active Content of SMS content
'011' signifies sharing of the Active content—Application initiation
'100' signifies sharing of the Active Content—Phone Book
3., B4, B5, B6 when set as:
'000' signifies the Bluetooth Handover Record Content
'001' signifies the WiFi Handover Record
'010' signifies the WiMedia Handover Record
4. B7 is Unused/Reserved for future use.

Figure 6:
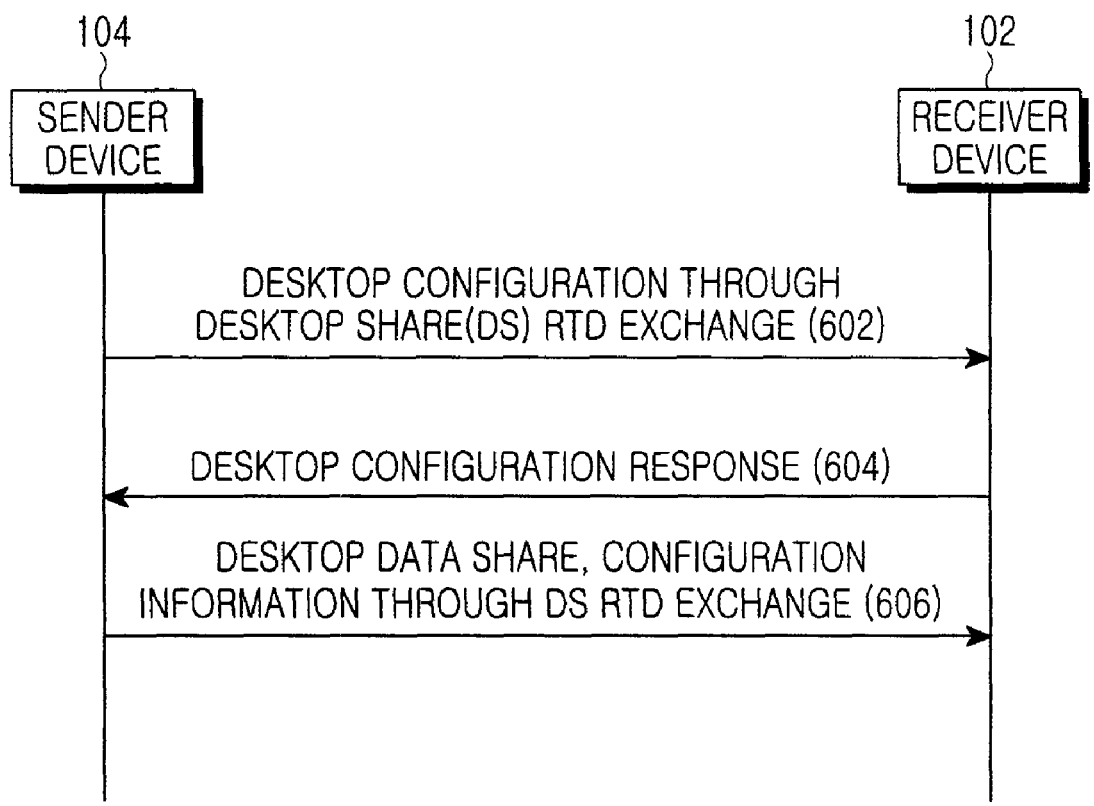
FIG. 6 illustrates a message flow diagram depicting a method for managing data in Near Field Communication (NFC) network, in accordance with an exemplary embodiment of the present invention.

FIG. 6 illustrates a message flow diagram depicting a method to share data, in accordance with one exemplary embodiment of the present invention.

In an exemplary embodiment, active data sharing between two electronic devices is explained. The electronic sender device 104 can share active data or sends active data to the electronic receiver device 102.

In an example, the active data is shared for viewing the data on a larger display if the receiver 102 desktop size is a larger sized display. For example, if the display screen of a electronic device is small, then the active desktop data can be shared with the electronic device having larger display screen. In another example, the desktop data is shared for initiating and using specific application displayed on the display screen of the electronic device.

Moreover, if a plurality of applications is displayed on the desktop of one electronic device, then one or more of the plurality of applications can be shared with another electronic device. Similarly, only a specific application from the plurality of applications may be shared with other electronic devices. Thus, an application highlighted on a desktop screen can be shared with only one other electronic device, or a number of electronic devices. Hence the highlighted application can be initiated with ease by another electronic device.

Furthermore, the highlighted application referred to above can also be configured as per the user's preference. For example, Chat session initiation with respective parameters for a chat application is exchanged, and a data for initiation of the chat application is shared using a current cursor position.

Referring to FIG. 6, for sharing active data, a communication channel is established between the sender device 104 and the receiver device 102, through NFC touch. Then, at step 602, the sender device 104 sends an active desktop share RTD with configuration information (explained above in conjunction with FIG. 4) with the receiver device 102. At step 604, the receiver device 102 sends a desktop configuration response to the sender device 104. In an exemplary embodiment, the receiver device 102 sends desktop configuration response including negotiation values.

Thereafter, at step 606, the sender device 104 sends desktop share configuration information through DS RTD exchange. In an exemplary embodiment, DS RTD is also sent by the receiver device 102 to the sender device 104 when data is shared. Thereafter, the active data is exchanged between the receiver device 102 and the sender device 104 (explained above in conjunction with FIG. 5). Hence, data from the sender device 104 is continuously transferred to the receiver device 102. Thereafter, the data is continuously displayed on a display screen of the receiver device 102. Thus, the active data displayed on the display screen of the sender device 104 is also displayed on the on the display screen of the receiver device 102.

Figure 7:
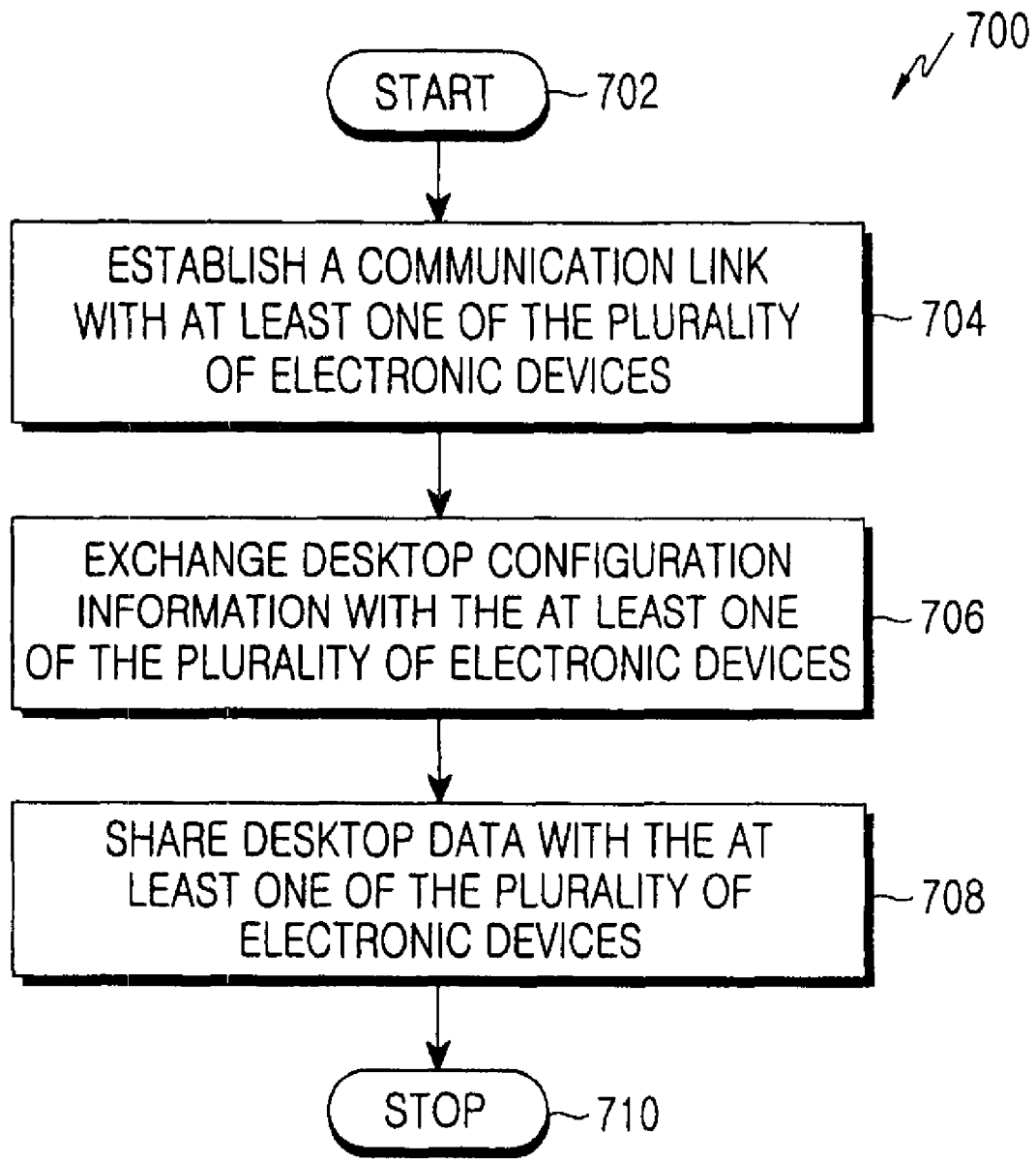
FIG. 7 illustrates a flow chart depicting exemplary operation of a method for managing data in Near Field Communication (NFC) network, in accordance with an exemplary embodiment of the present invention.

FIG. 7 illustrates a flow chart depicting exemplary operations of a method for managing data in a Near Field Communication (NFC) network, in accordance with one exemplary embodiment of the present invention. The flowchart in FIG. 7 will be explained with references made to FIGS. 1, 2, and 3. However, it will be apparent to a person ordinarily skilled in the art that the present exemplary embodiment is not limited in scope to the drawings discussed herein. The method can also include fewer steps (or additional steps) than as depicted in FIG. 7. Further, the order of the steps may also vary from what is shown and described.

Referring now to FIG. 7 at step 704, a first electronic device, for example, the electronic device 104, establishes a communication link with at least one of the plurality of electronic devices, for example the electronic device 102. The communication link there between is established preferably through a short range wireless communication technique. In an exemplary embodiment, the communication link is established through a near field communication technique. For example, the communication between the electronic device 104 and the electronic device 102 can be established based on a peer-to-peer mode of communication in NFC network. In an exemplary embodiment, the communication between the electronic device 104 and the electronic device 102 is established based on a reader/writer mode of communication in NFC. The transceiver 202 of the electronic device 104 establishes a communication link with the electronic device 102.

Thereafter, desktop configuration information is exchanged, when the communication link is established. At step 706, the first electronic device exchanges desktop configuration information with the at least one of the plurality of electronic devices. For example, the electronic device 104 exchanges desktop configuration information with the electronic device 102. The desktop configuration information is exchanged based on one or more DS RTD. In an exemplary embodiment, the electronic device 104 exchanges desktop configuration information based on the data format 400.

At step 708, the first electronic device shares the desktop data with the at least one of the plurality of electronic devices. For example, the electronic device 104 shares data displayed on a display screen with the electronic device 102. Hence, the data displayed on the display screen of the electronic device 104 is also displayed at a display screen of the electronic device 102.

For example, the desktop data can be shared based on one or more DS RTD. In another embodiment, the desktop data is shared based on the data format 500. In a particular exemplary embodiment, the desktop data is shared based on the desktop configuration response received from the at least one of the plurality of electronic device. At step 710, the method is terminated.

Various exemplary embodiments of the present invention described above provide the following advantages. The present invention provides a method to share data between one or more electronic devices through Near Field Communication (NFC). For sharing active data, a new NFC RTD named as Desktop Share (DS) Record Type Definition (RTD). The method allows, an active display of an electronic device to be shared with another electronic handheld device or with an electronic device having a large and/or smaller display. Other/additional electronic devices can also share an active display, for example, at least a third electronic device for accessing one or more applications from the first electronic device after establishing a link via NFC with one of the second electronic device or the first electronic device.

Further, using this method active desktop can be shared with a simple NFC touch. Thereby, currently active desktop data is shared with a peer electronic device. The active desktop data could be Empty Desktop (Wall Paper image, clock parameters etc), SMS contents, Phone Book entry (.vcf format), Chat Session initiation and Application startup (gaming).

The method also enables a user to share only a specific portion of the active data. The method allows an electronic device to initiate and use specific applications from the active data of the electronic device. For example, an electronic device can use camera feature of other electronic devices. The method can also enable active voice communication transfer. For example active voice communication of an electronic device can be shared with other electronic devices.

While the exemplary embodiments of the present invention have been illustrated and described, it will be clear that the present invention and its advantages are not limited to these embodiments only. Numerous modifications, changes, variations, substitutions and equivalents will be apparent to those skilled in the art without departing from the spirit and scope of the present invention as described in the claims.

I claim:

1. A method for managing data between a plurality of electronic devices in a Near Field Communication (NFC) network, the method performed at a first electronic device comprising:
    establishing a communication link with a second electronic device;
    transmitting desktop configuration information to the second electronic device including negotiation values, wherein the desktop configuration information includes a type of desktop data;
    receiving a desktop configuration response corresponding to the desktop configuration information and the desktop configuration response being positive when the electronic device is capable of sharing active data,
    sharing the desktop data associated with the type of the desktop data with the second electronic device, wherein transmitting the desktop configuration information comprises interchanging an Active Desktop Sharing (DS) Record Type Definition (RTD) along with configuration information with the second electronic device, wherein the DSRTD comprises multiple configuration records or a content record for data exchange.

2. The method of claim 1, wherein transmitting the desktop configuration information comprises interchanging one or more Record Type Definitions with the second electronic device and performing negotiation of different types of configurations in a unified way.

3. The method of claim 1, wherein sharing the desktop data comprises sending active desktop data displayed at the first electronic device to the second electronic device by performing negotiation of data contents as per each different type of application.

4. The method of claim 1, Wherein sharing the desktop data comprises performing action on a first section of the active desktop data displayed at the first electronic device to the second electronic device.

5. The method of claim 4, wherein performing an action on a first section of the active desktop data comprises accessing one or more applications of the first electronic device by the second electronic device; and
    wherein the one or more applications comprises at least one chat of a: session application, multimedia application, communication application, audio/video application, and gaming application.

6. The method of claim 1, further comprising sharing the desktop data based on Active Desktop Share (DS) Record Type Definition (RTD) configuration response received from the second electronic device.

7. The method of claim 1, further comprising displaying the desktop data on a display unit of the first electronic device and a display unit of the second electronic device.

8. The method of claim 1, further comprising setting a communication network between the first electronic device and the second electronic device based on at least one of a peer-to-peer mode of communication and reader/writer mode of communication.

9. The method of claim 8, wherein setting the communication network comprises establishing one or more short range wireless communication networks.

10. An apparatus for managing data between a plurality of electronic devices included a first electronic device in a Near Field Communication (NFC) network, the first electronic device comprising:
    a transceiver for establishing a communication link with at least a second electronic device including negotiation values; and
    a processor for enabling transmission of desktop configuration information to the second electronic device and receive a desktop configuration response and for sharing desktop data with the second electronic device and the desktop configuration response being positive when the electronic device is capable of sharing active data,
    wherein the desktop configuration information includes a type of the desktop data;
    wherein the processor interchanges Active Desktop Sharing (DS) Record Type Definition (RTD) wherein the DSRTD comprises multiple configuration records or a content record for data exchange along with configuration information with the second electronic device to transmit the desktop configuration information.

11. The apparatus of claim 10, wherein the processor interchanges one or more Record Type Definitions with the second electronic device to transmit the desktop configuration information and performing negotiation of different types of configurations in a unified way.

12. The apparatus of claim 10, wherein the transceiver sends active desktop data displayed at the first electronic device to the second electronic device to share the desktop data by performing negotiation of data contents as per each different type of application.

13. The apparatus of claim 10, wherein the second electronic device performs action on a first section of the active desktop data displayed at the first electronic device.

14. The apparatus of claim 13, wherein the second electronic device accesses one or more applications of the first electronic device; and
    wherein the one or more applications comprises at least one of a: chat session application, multimedia application, communication application, audio/video application, and gaming application.

15. The apparatus of claim 10, wherein the processor shares the desktop data based on Active Desktop Share (DS) Record Type Definition (RTD) configuration response received from the second electronic device.

16. The apparatus of claim 10, wherein the second electronic device comprises a display unit for displaying the desktop data on a display unit of the first electronic device.

17. The apparatus of claim 10, wherein the first electronic device and the second electronic device set a communication network based on at least one of a peer-to-peer mode of communication and reader/writer mode of communication;
    wherein the communication network comprises one or more short range wireless communication networks.

* * * * *